Patented Jan. 31, 1939

2,145,501

UNITED STATES PATENT OFFICE 2,145,501

PRODUCTION OF ARALKENYL COMPOUNDS AND POLYMERIZATION PRODUCTS THEREOF

Hein Israel Waterman and Willem Johannes Cornelis de Kok, Delft, Netherlands, assignors to Shell Development Company, San Francisco, Calif., a corporation of Delaware No Drawing. Application October 26, 1936, Serial No. 107,625. In the Netherlands November 13, 1935

3 Claims. (Cl. 260—669)

This invention relates to a practical and economical process for the conversion of aralkyl alcohol ethers to useful products of the class consisting of aralkenyl compounds of the type of styrene and its homologues, and substitution products and polymerization products of such aralkenyl compounds.

The process of the invention may be executed in a variety of suitable manners depending upon the nature of the product or products desired. When the object of the invention is to convert an aralkyl alcohol ether of the class herein described to polymerization products of the aralkenyl compound resulting from the dealcoholation or splitting of a molecule of an alcohol from a molecule of the treated aralkyl alcohol ether, the process may be executed by contacting the aralkyl alcohol ether, in either the liquid or the gaseous phase, with a heated solid contact mass comprising a dehydration catalyst at a temperature sufficiently high to effect substantial dealcoholation of the treated ether with the formation of the corresponding aralkenyl compound of the type of styrene. The reaction mixture consisting for the most part of the resulting aralkenyl compound, and the alcohol split from the treated aralkyl ether, and/or the dehydration products of said alcohol may then, without resorting to separation of the aralkenyl compound therefrom, be contacted with a polymerization catalyst under conditions of temperature and pressure adequate to polymerize the aralkenyl compound content of the mixture to the required aralkenyl compound polymer.

The aralkyl alcohol ether may be contacted with the dehydration catalyst in the initial step of the process under such conditions of temperature and throughput that the alcohol split from the aralkyl ether is substantially stable. If desired, this alcohol may be separated from the reaction mixture prior to contact of the mixture with a polymerization catalyst for polymerization of the aralkenyl compounds. The recovered alcohol may be used for any purpose desired. It may, for example, be utilized for the manufacture of more of the aralkyl ether and thus reutilized in the system. Under some conditions of operation, particularly at relatively high temperatures, the alcohol split from the treated aralkyl ether may, under the influence of the dehydration catalyst at the temperature of the dealcoholation, be wholly or partly dehydrated resulting in the formation of water and the corresponding olefinic or substituted olefinic compound. The olefinic compounds may or may not be separated from the aralkenyl compound prior to effecting polymerization. In the majority of cases it is preferable to treat the reaction mixture leaving the dehydration zone in its entirety to effect polymerization of the aralkenyl compounds. The polymerization step may be effected under such conditions and in the presence of such a polymerization catalyst that the aralkenyl compounds are selectively polymerized, or the polymerization may be effected under such conditions that the olefine content of the mixture is also polymerized, and a mixture of olefine polymers as well as aralkenyl compounds is obtained, or the polymerization may be effected under such conditions that the aralkenyl compounds polymerize at least in part with the olefines and mixed- or inter-polymers are obtained. The olefines recovered from the reaction mixture, either prior to or subsequent to the polymerization treatment, may be separately polymerized to higher molecular weight hydrocarbons useful as motor fuels, components of fuel mixtures, lubricating oils and the like, or they may be polymerized to resins, resinous materials and the like, or they may be hydrated to alcohols and/or ethers, halogenated to valuable unsaturated halides, converted to halohydrins, etc.

A specific embodiment of the invention comprises direct conversion of the treated aralkyl alcohol ether into polymers of the aralkenyl compound resulting from dealcoholation of the treated ether by a single stage process which comprises contact of the aralkyl alcohol ether with a solid contact mass consisting of or comprising materials capable of effecting substantially simultaneously the dealcoholation of the aralkyl alcohol ether and the polymerization of the aralkenyl compound and other products resulting from the dealcoholation. For this purpose we may use a catalyst which under the conditions of its use in the process is capable of acting as a dehydration catalyst as well as a polymerization catalyst, or a suitable mixture of preferably solid dehydration and polymerization catalysts may be used. When using a solid contact mass which combines the properties of a dehydration catalyst and a polymerization catalyst, the reactions of dealcoholation and polymerization may be made to occur substantially simultaneously whereby the desired polymer product may be obtained in a single stage operation.

A principal object of the invention is to provide a practical and economical process for the dealcoholation of aralkyl alcohol ethers to the corresponding aralkenyl compounds of the type of styrene and its homologues. The term "dealcoholation" as used herein and in the appended claims means the splitting out or removal of a molecule of an alcohol from the molecule of the treated aralkyl alcohol ether. The aralkenyl compounds prepared in accordance with this embodiment of our invention are useful for a wide variety of purposes. They may, by any suitable method, be polymerized to useful oils, resins and resinous materials; they may be hydrated to valuable aralkyl alcohols and glycols; they may be halohydrinated to useful aralkyl halohydrins; they may be halogenated to saturated and unsaturated aromatic derivatives; they may be carboxylated to valuable aralkyl carboxylic acids; and the like.

If the object is to dealcoholate an aralkyl alcohol ether of the class to which the invention pertains to obtain as the main reaction product the corresponding aralkenyl compound of the type of styrene and its homologues, and substitution products of the same, the process is executed by contacting the aralkyl alcohol ether, in the liquid or gaseous phase, with a solid catalyst mass consisting of or comprising a dehydration catalyst capable of effecting substantially only dehydration at the temperature of operation, the catalyst mass being maintained at a temperature adequate to effect dealcoholation of the treated ether at a practical rate while undesirable side reactions, as polymerization of the resulting aralkenyl compound, are substantially obviated.

The aralkyl alcohol ethers which may be converted to valuable aralkenyl compounds and/or polymerization products thereof in accordance with the process of the invention may be conveniently represented by the general formula R—O—R₁, wherein R represents an aralkyl radical containing at least two carbon atoms in the alkyl side chain and linked to the ether oxygen atom by a carbon atom of said chain, and R₁ represents an alkyl radical or an aralkyl radical different from the aralkyl radical represented by R. The radicals represented by R and R₁ may be hydrocarbon radicals or they may be hydrocarbon radicals wherein one or more hydrogen atoms is/are substituted by suitable inorganic substituents, such as halogen atoms, an amino group, an oxygen atom, a metal radical, the negative radical of a mineral acid, etc., or an organic substituent as an ether group, a carbonyl group, a carboxylic acid group, a carboxylic acid ester group and the like. It is seen that R represents aralkyl radicals comprising alkyl radicals as ethyl, propyl, isopropyl, butyl, isobutyl, tertiary butyl, amyl and the like, wherein one or more hydrogen atoms is/are substituted by an aryl radical such as phenyl, cresyl, xylyl, naphthyl, anthryl and the like, which aralkyl radical may be further substituted. The aralkyl radicals represented by R₁ may be any one of the above as well as those aralkyl radicals which possess only a single carbon atom in the side chain as the benzyl radical and the like. The following are typical of alkyl radicals which R₁ may represent: methyl, ethyl, propyl, isopropyl, butyl, secondary butyl, isobutyl, tertiary butyl, the amyl radicals, the hexyl radicals and the like and their homologues and suitable substitution products.

Two preferred groups of aralkyl alcohol ethers may be represented by the more specific general formulae:

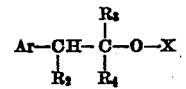

and

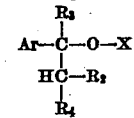

wherein Ar represents any aryl radical which may be further substituted, R₂, R₃ and R₄ representing hydrogen atoms, organic radicals as alkyl, aryl, aralkyl, alicyclic, heterocyclic and the like, or inorganic or organic substituents as —Cl, —Br, —I, —NH₂, —COOH, —COOR, —O—R and the like, and X represents an alkyl radical or an aralkyl radical, X containing an aryl radical different than the aryl radical represented by Ar when R₂, R₃ and R₄ in the second formula represent hydrogen atoms.

Some readily available aralkyl alcohol ethers which are representative of the class of ethers which are dealcoholated in accordance with the process of the invention are the following: phenyl-1 methoxy-2 ethane, phenyl-1 ethoxy-2 ethane, phenyl-1 isopropoxy-2 ethane, phenyl-1 methoxy-1 ethane, phenyl-1 ethoxy-1 ethane, phenyl-1 propoxy-1 ethane, phenyl-1 butoxy-1 ethane, phenyl-1 methoxy-1 propane, phenyl-1 benzyloxy-2 ethane, phenyl-1 benzyloxy-1 ethane, phenyl-1 benzyloxy-2 propane, phenyl-1 methoxy-2 propane, phenyl-1 methoxy-3 propane, phenyl-1 ethoxy-2 propane, phenyl-2 ethoxy-2 propane, phenyl-1 isopropoxy-2 propane, phenyl-1 methoxy-2 butane, chlor-2 phenyl-1 ethoxy-1 propane, chlor-3 phenyl-1 ethoxy-1 propane, dichlor-2,2 phenyl-1 ethoxy-1 propane, cresyl-1 methoxy-2 ethane, cresyl-1 methoxy-2 ethane, cresyl-1 ethoxy-1 ethane, cresyl-1 isopropoxy-1 ethane, cresyl-1 ethoxy-2 propane, xylyl-1 methoxy-1 ethane, xylyl-1 propoxy-1 ethane, naphthyl-1 methoxy-1 ethane, naphthyl-1 ethoxy-1 ethane, naphthyl-1 ethoxy-2 propane, anthryl-1 methoxy-1 ethane, anthryl-1 ethoxy-2 propane and the like and their homologues, analogues and suitable substitution products.

In the step of our process which comprises dealcoholation of the aralkyl alcohol ether to the corresponding aralkenyl compound, catalysts of the class known as dehydration catalysts are preferably employed. In general, catalysts known to be useful for the dehydration of alcohols are useful as dealcoholation catalysts in the process of our invention.

Suitable representative dehydration catalysts are the metals as brass, finely divided nickel, cobalt, iron, copper, platinum, etc.; the metal oxides as alumina, thoria, ceria, zirconia, the chromium oxides, the tungsten oxides, titanium oxide, beryllium oxide, uranium oxide, vanadium oxide, molybdenum oxide, iron oxide, zinc oxide and the like; certain non-metal oxides as silica, the phosphorus oxides and the like; the metal salts as aluminum sulphate, aluminum chloride, aluminum phosphate, aluminum silicate, the corresponding thorium, cerium and zirconium salts, zinc chloride, magnesium chloride and the like. The dehydration catalysts may be used severally or in admixture in any desired physical form. If desired, they may be incorporated with or deposited on supporting or "carrier" materials of which the following are typical: charcoal, pumice, clay, fuller's earth, diatomaceous earth, bentonite, montmorillonite and the like. Under some conditions, such carrier materials have dehydrating activity and may be used alone.

When the process is executed to effect substantial dealcoholation of the aralkyl ether in the dealcoholation stage without substantial polymerization of the resulting aralkenyl compound or compounds, the dealcoholation is preferably effected at a temperature of from about 200° C. to about 400° C. in the presence of a catalytic material which effects substantially only dealcoholation or dehydration under the conditions of operation. A preferred group of dehydration catalysts for this purpose embraces the metal oxides and metal salts above-listed, particularly the oxides and salts of the metals aluminum, thorium, cerium, zirconium, tungsten, chromium, titanium, molybdenum and the like. It is to be understood that the temperature used will be dependent to a certain extent on the particular catalyst material selected and upon the particular aralkyl alcohol ether treated. A preferred temperature range is from 200° C. to about 400° C., but higher or lower temperatures may be advantageously used in some cases. Excellent results have been obtained by using metal oxide catalysts of the type of alumina, thoria, ceria, etc. at temperatures of from about 250° C. to about 350° C.

The dealcoholation reaction may be executed with the aralkyl alcohol ether in either the liquid or vapor phase at any desired pressure. Preferably the reaction is effected in the vapor phase at atmospheric or moderately reduced pressure. In some cases, however, superatmospheric pressures may be advantageously applied.

Suitable representative materials which are capable of catalyzing dehydration and polymerization in the same temperature range, and which may be used in the execution of the invention to convert a suitable aralkyl alcohol ether directly to polymers of the aralkenyl compound resulting from dealcoholation of the aralkyl alcohol ether by effecting substantially simultaneously the dealcoholation and polymerization are the following: the metals as zinc, aluminum, copper and metals of Group VIII of the periodic table, preferably employed in a finely divided form; the acid-acting metal salts as zinc chloride, zinc bromide, magnesium chloride, aluminum chloride, beryllium chloride, zinc sulphate, aluminum sulphate, cadmium sulphate, lead sulphate, bismuth oxychloride, copper phosphate and the like. The members of the above group of catalysts may be used in admixture with catalysts as herein described which have substantially only a dehydration effect, or they may be used with any of the hereinafter described polymerization catalysts when a stronger polymerization influence is desired. Catalyst masses having a combined dehydration and polymerization action may be prepared by mixing one or more materials which are substantially only dehydration catalysts under the conditions of the operation with one or a mixture of polymerization catalysts active under the same conditions. Other suitable solid catalyst masses which have a combined dealcoholation and polymerization activity comprise the strong mineral acids as sulphuric, phosphoric, etc., absorbed by or deposited on solid absorbent materials, particularly the absorbent siliceous materials as pumice, clays, fuller's earth, bentonite, etc.

The combined substantially simultaneous dealcoholation-polymerization may be effected in the liquid or vapor phase under substantially the same conditions of temperature and pressure as are suitable for the dealcoholation reaction alone. However, it may in some cases be desirable to apply higher temperatures and pressure than would be necessary if substantially only dealcoholation were effected.

The aralkenyl compounds resulting from the dealcoholation of an aralkyl alcohol ether may be polymerized to valuable polymers thereof in a wide variety of manners in either the liquid or the gaseous phase. The reaction mixture leaving the dealcoholation stage may be conducted directly to a polymerization stage wherein polymerization of the aralkenyl compounds with or in the presence of other constituents is effected. If desired, the reaction mixture leaving the dealcoholation stage may be first treated and the aralkenyl compound separated therefrom and polymerized in the substantial absence of other polymerizable materials or in the presence or with added polymerizable materials.

The polymerization may be effected in the absence of catalysts, for example, under the influence of high temperature and pressure, or in the presence of any suitable material capable of catalyzing polymerization of aralkenyl compounds of the type of styrene and its homologues.

When liquid phase methods of polymerization are employed, preference is given to those polymerization agents, per se or in solution or suspension, which may also serve as media for the absorption or solution of the aralkenyl compounds and other unsaturated compounds present. Suitable agents of this type are the mineral acids as the hydrogen halides, the sulphuric acids, the phosphoric acids, the phosphorous acids, the arsenic acids and the like as well as their anhydrides. The phosphoric, phosphorous and sulphuric acids may be employed in the liquid state or in a substantially solid state deposited on or in admixture with a solid siliceous material or similar absorbent material. The strong organic acids as benzene sulphonic acid and its homologues and analogues may also be employed. Other suitable polymerization agents which are preferably employed in solution or suspension in water are the acid salts as zinc chloride, zinc sulphate, cadmium sulphate, copper phosphate, etc.

Other suitable representative polymerization agents which may be used in liquid or vapor phase operations, but which are particularly suitable for the latter, are the inorganic halides as $AlCl_3$, $ZnCl_2$, $MgCl_2$, $FeCl_3$, $NiCl_2$, $BeCl_2$, $BeF_2$, $AsF_3$, $SbF_3$, $SnCl_4$, $TiCl_4$, $PF_3$, $BF_3$ and the like. Such catalysts may be used alone or in admixture with each other and/or other materials as carriers, metals, etc.

The polymerization step of the process may be effected at any suitable temperature and pressure and in the presence or absence of substantially inert diluents and solvents for the reactants and/or products. In general, we prefer to effect the polymerization under atmospheric or superatmospheric pressure since pressure in general favors reactions of this type.

Representative aralkenyl compounds which may be prepared in accordance with the invention are the following:

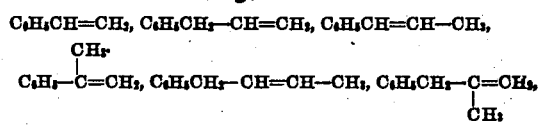
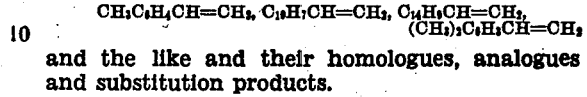

and the like and their homologues, analogues and substitution products.

The following specific example illustrates a suitable mode of executing the invention. It is to be understood that the invention is not to be regarded as limited to the materials, catalyst or mode of operation described in the example, which is for illustrative purposes only.

*Example*

A catalyst tube was packed with granules of alumina ($Al_2O_3$). The packed catalyst tube was heated to and maintained at a temperature of about 325° C. while the vapors of 1-phenyl methoxy-1 ethane

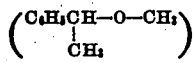

were passed through it. The product of the reaction was styrene ($C_6H_5CH=CH_2$), which product was obtained in a yield greater than 80%. Methyl alcohol was a by-product of the reaction.

Substantially the same results were obtained when the aralkyl ethers phenyl-1 ethoxy-1 ethane and (phenyl-1' ethoxy)-2 propane were treated under like conditions with alumina, as well as with catalysts as ceria, zirconia, thoria, tungsten oxide, molybdenum oxide and the like.

The many uses to which the products obtained in accordance with the invention may be put have been indicated in the foregoing. The products are highly suitable for the manufacture of polymerization and condensation products such as polystyrene and the like polymers and other resins and resinous materials with glass-like and resin-like properties. Such resins and resinous materials may be mixed with suitable plasticizers and softeners and molded into all sorts of objects, contingently with the addition of fillers as sawdust and the like, which objects can be worked easily with tools such as planes, drills, saws, etc.

It will be apparent to those skilled in the art to which the invention pertains that the process of the same may be executed in a batch, intermittent or continuous manner.

It is to be understood that the terms "alkyl radical" and "aralkyl radical" are intended to embrace, as well as the alkyl and aralkyl hydrocarbon radicals, such hydrocarbon radicals wherein one or a plurality of hydrogen atoms is/are substituted by suitable inorganic or organic substituents. The term "aralkenyl compound" is intended to embrace compounds of the type of styrene as well as substitution products of such compounds.

The character of the invention and the marked commercial value thereof can be seen from a consideration of the preceding specification and the instance of results given but neither is to be considered as imposing corresponding limitations upon the invention, the scope of which is defined by the appended claims.

We claim as our invention:

1. In a process for the conversion of an aralkyl alkyl ether to an aralkenyl hydrocarbon polymer, the step which comprises contacting an aralkyl alkyl ether of the general formula $R—O—R_1$, wherein R is an aralkyl hydrocarbon radical containing at least two carbon atoms in the alkyl chain and linked to the ether oxygen atom by one of said carbon atoms, and $R_1$ is an alkyl hydrocarbon radical, with a solid dehydration-polymerization catalyst mass at a temperature at which simultaneous dealcoholation of the aralkyl alkyl ether and polymerization of the resulting aralkenyl hydrocarbon occur.

2. In a process for the conversion of an aralkyl alkyl ether to an aralkenyl hydrocarbon polymer, the step which comprises contacting an aralkyl alkyl ether of the general formula $R—O—R_1$, wherein R is an aralkyl hydrocarbon radical containing at least two carbon atoms in the alkyl chain and linked to the ether oxygen atom by one of said carbon atoms, said $R_1$ is an alkyl hydrocarbon radical, with a solid dehydration-polymerization catalyst mass at a temperature of from about 200° C. to about 400° C., whereby simultaneous dealcoholation and polymerization occur and the aralkyl alkyl ether is dealcoholated while the resulting aralkenyl hydrocarbon is polymerized.

3. In a process for the production of a styrene polymer from the alkyl ether of a mono-phenyl substituted ethanol, the step which comprises contacting an aralkyl alkyl ether of the general formula $R—O—R_1$, wherein R represents a radical of the group consisting of

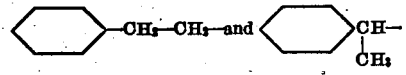

and $R_1$ represents an alkyl hydrocarbon radical, with a solid dehydration-polymerization catalyst at a temperature of from about 200° C. to about 400° C., whereby dealcoholation and polymerization occur simultaneously, the aralkyl alkyl ether being dealcoholated to styrene while the styrene is being polymerized to a styrene polymer.

HEIN ISRAEL WATERMAN.
WILLEM JOHANNES CORNELIS DE KOK.